US005614117A

United States Patent [19]
Krobath

[11] Patent Number: 5,614,117
[45] Date of Patent: Mar. 25, 1997

[54] WELDING APPARATUS AND SHIELD THEREFOR

[76] Inventor: Eric M. Krobath, 459 Atlantic Ave., Freeport, N.Y. 11520

[21] Appl. No.: 545,410

[22] Filed: Oct. 19, 1995

[51] Int. Cl.⁶ .................................................. B23K 9/173
[52] U.S. Cl. .......................... 219/147; 219/74; 219/136
[58] Field of Search ............................. 219/147, 136, 219/74, 75

[56] References Cited

U.S. PATENT DOCUMENTS

| 1,716,096 | 6/1929 | Weeks | 219/147 |
|---|---|---|---|
| 2,210,370 | 8/1940 | Herradora | 219/147 |
| 2,410,306 | 10/1946 | Romberg | 219/147 |
| 2,832,881 | 4/1958 | Andriola | 219/75 |
| 2,928,933 | 3/1960 | Andriola | 219/147 |
| 2,945,943 | 7/1960 | Meyer | 219/147 |
| 4,379,962 | 4/1983 | Hirst | 219/147 |
| 4,788,401 | 11/1988 | Kleppen | 219/75 |
| 5,045,665 | 9/1991 | Sarkissian | 219/136 |

*Primary Examiner*—Clifford C. Shaw
*Attorney, Agent, or Firm*—Hoffmann & Baron

[57] ABSTRACT

A welding apparatus and shield are provided for safely and effectively welding metal structures. The shield includes a translucent body having an oblique end surface which, in part, extends beyond the end of a gas nozzle of an arc welding apparatus. The operator may safely view the arc plasma generated between the nozzle and a workpiece through a relatively flat portion of the shield. The shield substantially covers the arc plasma while in use, protecting the operator as well as bystanders.

23 Claims, 6 Drawing Sheets

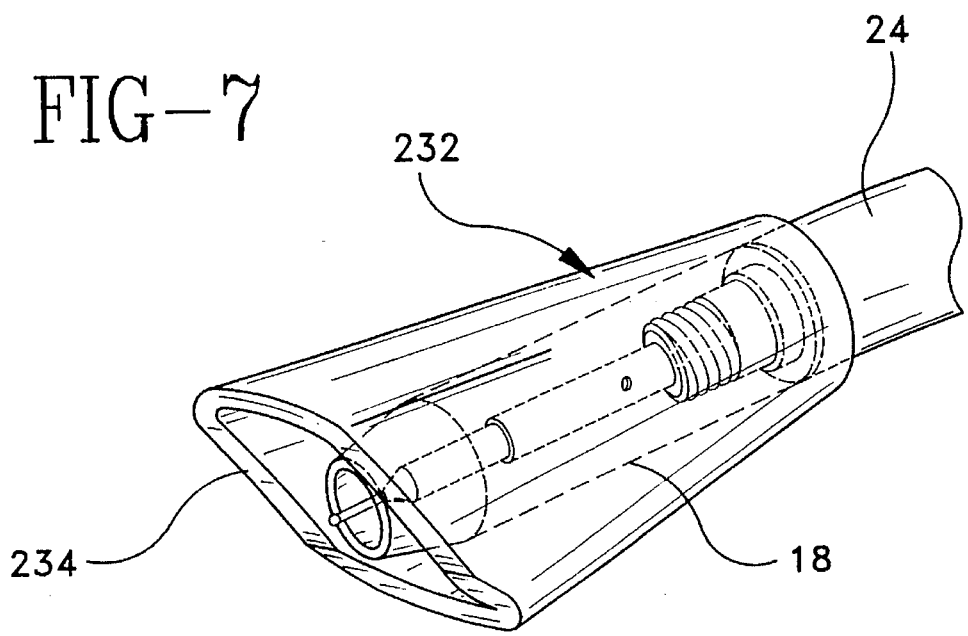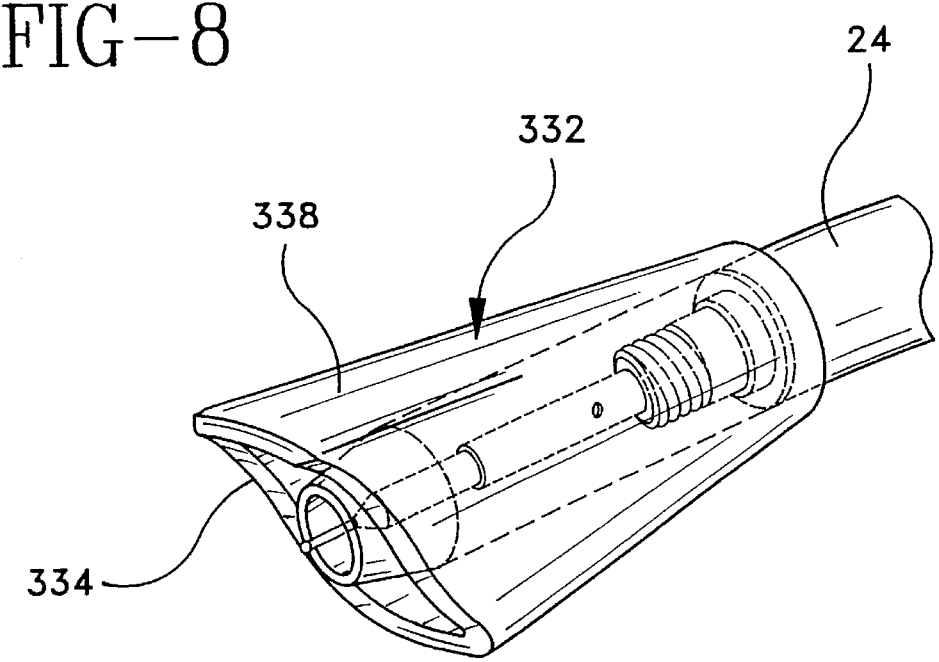

WELDING APPARATUS AND SHIELD THEREFOR

BACKGROUND OF THE INVENTION

1. Field of the Invention

The field of the invention relates to arc welding apparatus, and particularly to shields for such apparatus.

2. Brief Description of the Prior Art

Mig and tig welders are in widespread use today. Mig welders are commonly employed for joining metal plates or panels which are substantially the same in thickness. Such materials may be tack welded, stitch welded or otherwise joined.

A mig welder typically includes a handle, a torch tip connected to the handle, a mig wire extending from the torch tip, and a gas nozzle threadably connected to the torch tip. The torch tip includes an external thread coupled to an internal thread within the gas nozzle. When the gas nozzle is attached to the torch tip, the mig wire extends slightly beyond the open end of the gas nozzle. The handle includes a trigger for controlling the operation of the apparatus.

A tig welder may be used for joining metal pieces having different thicknesses, and may also be used where greater precision is required than can be achieved through the use of a mig welder. A rig welder includes a handle, tip assembly coupled to the handle, and a solid rod extending from the tip assembly through the nozzle. The rod may be advanced as necessary. The handle typically does not include a trigger. A foot pedal is instead generally employed for controlling the flow of gas and the amperage.

Persons employing either of the above types of welders must take precautions in order to avoid injury due to harmful welding flash. The light generated at the tip of the nozzle is intense, and is capable of damaging the eyes and skin. In order to protect against such injuries, a person ordinarily wears a welding helmet which includes a translucent shield. The shield provides limited visibility when the welder is operated. It is usually impossible to view the workpieces, however, prior to generation of the arc plasma at the nozzle. The shield must accordingly be flipped up prior to beginning the welding process, the nozzle placed at the site of the weld, the shield flipped down, and the joint finally welded. As the workpieces often need to be welded at a plurality of points or along a plurality of lines, the constant need to manipulate the shield becomes tedious and time-consuming. In addition, the position of the nozzle may be inadvertently changed while the shield is flipped, resulting in an inaccurate weld. The weld site is often difficult to locate, making use of a helmet almost totally impractical. As discussed above, the health risks to a person who operates without a shield are substantial.

Another approach for protecting against welding flash has been to use a hand-held shield. While such shields are easier to manipulate than the shield on a helmet, they are impractical for any job which requires the use of two hands. Like the shield mounted to helmets, no protection is provided to persons other than the one who is actually welding. As many workplaces do not include isolated areas for welding, all persons in the workplace may be at risk.

SUMMARY OF THE INVENTION

It is an object of the invention to provide a welding apparatus and a shield which provides substantial protection against welding flash for both the user and those who may be in proximity to the user.

It is a further object of the invention to provide an apparatus and shield which allows one to work more efficiently and accurately without sacrificing safety.

In accordance with such objects, a welding apparatus is provided which includes a welding tip assembly including an end portion, a handle secured to the welding tip assembly, and a shield covering at least part of the end portion of the welding tip assembly, the shield including a body having a translucent portion for substantially, but not entirely, preventing the transmission of light through the body from the end portion of the welding tip assembly. The shield includes an open end for allowing arc plasma from the end portion to exit the shield. The shield body is preferably tubular, and includes an oblique end surface defining the open end. When properly positioned adjacent the workpiece or workpieces, the arc plasma is substantially covered from every angle, thereby protecting the user and those in the workplace from welding flash.

As there are many existing mig and tig welders in use, a shield is provided for use with such welders. A shield according to the invention includes a tubular body having first and second ends and a passage connecting the ends. An end wall extends substantially perpendicularly from the first end of the body, and includes an opening communicating with the passage. The tubular body is made at least in part from a translucent material. Such a shield may be designed for use with the existing nozzle of a welding gun, in which case the nozzle would abut against the end wall of the shield while threadably coupled to the tip assembly. Alternatively, the nozzle may be an integral part of the shield, whereby the shield includes an internal thread for coupling to the welding tip assembly.

As it may not be necessary to see through the shield in all welding applications, such as when the welding gun is operated by robotic equipment or the like, the use of a translucent shield may not be required. A welding apparatus is accordingly provided which may or may not include a translucent portion. The apparatus includes a tip assembly, a gas nozzle coupled to the tip assembly, and a shield having a tubular body which substantially envelopes the gas nozzle. The tubular body includes first and second ends and a passage connecting the ends and containing the nozzle. The first end includes an end wall which abuts against an end of the nozzle, thereby maintaining the shield in place on the tip assembly. The second end of the shield is open, and is preferably defined by an end surface extending obliquely with respect to the end wall at the first end of the shield.

The invention further allows mig or tig welding to be accomplished through the use of a novel method. The method includes the steps of positioning the shield in close proximity to the workpiece such that the nozzle adjoins a welding site, causing arc plasma to be generated at the nozzle tip, and effecting a weld while substantially occluding the arc plasma. If the shield is translucent, the arc plasma can be observed without causing damage to the skin and/or eyes.

BRIEF DESCRIPTION OF THE DRAWINGS

FIG. 7 is a top perspective view of a second alternative embodiment of the invention;

FIG. 8 is a top perspective view of a third alternative embodiment of the invention;

DETAILED DESCRIPTION OF THE INVENTION

Figure 1:
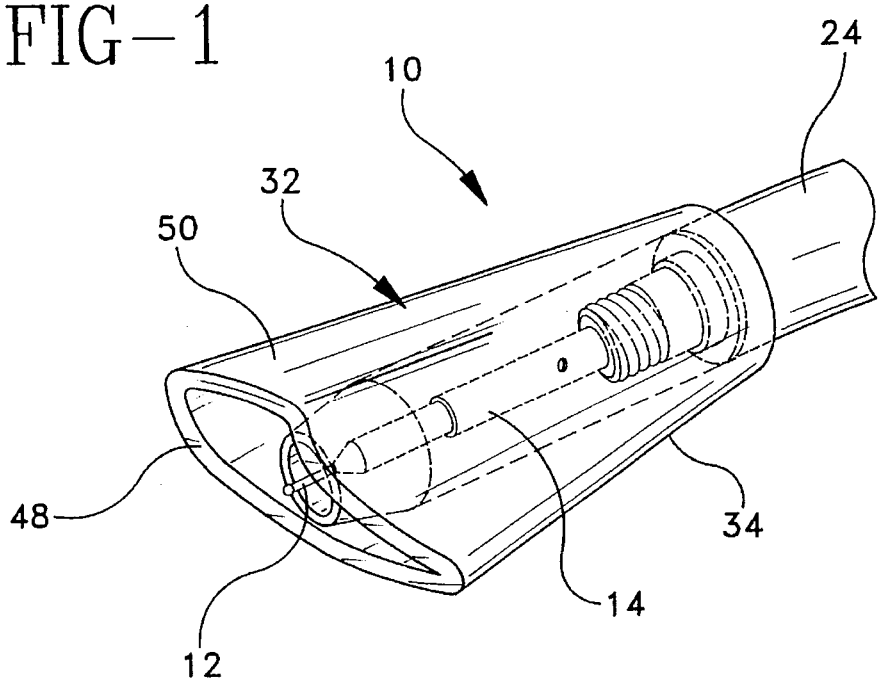
FIG. 1 is a top perspective view of a shielded tip portion of a mig welding apparatus according to the invention.

A welding apparatus 10 is provided for safely performing certain arc welding operations. The welding apparatus shown in FIGS. 1–4 is often referred to as a mig welder or a plasma-mig welder. It includes a consumable electrode wire 12 which extends from a guide tip 14. The guide tip includes an external thread 16, as shown in FIGS. 2 and 4. A gas nozzle 18 having an internal thread 20 is threadably secured to the guide tip, as shown in FIG. 2. The nozzle, which is also known in the trade as a shielding cup, includes a tapered end 22 through which an inert gas or mixture of gases may exit the tip assembly of the apparatus.

The guide tip is mounted to an insulated tube 24. The tube 24 is mounted to a handle 26. The handle includes a trigger 28 for controlling the flow of gas. As the wire 12 is consumed during use, a feed mechanism (not shown) is ordinarily provided for advancing the wire.

Figure 3:
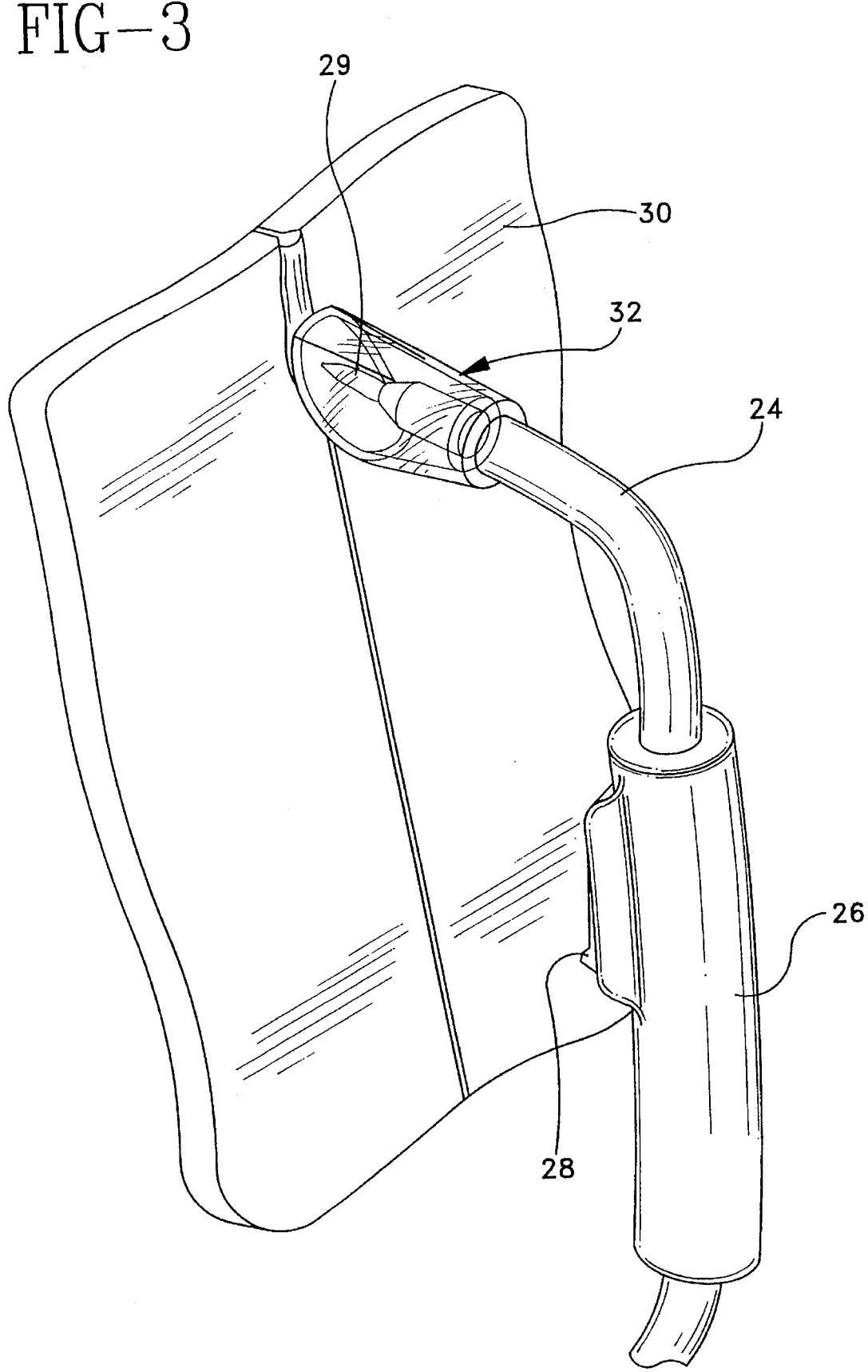
FIG. 3 is a perspective view showing a method of using the welding apparatus.
Figure 4:
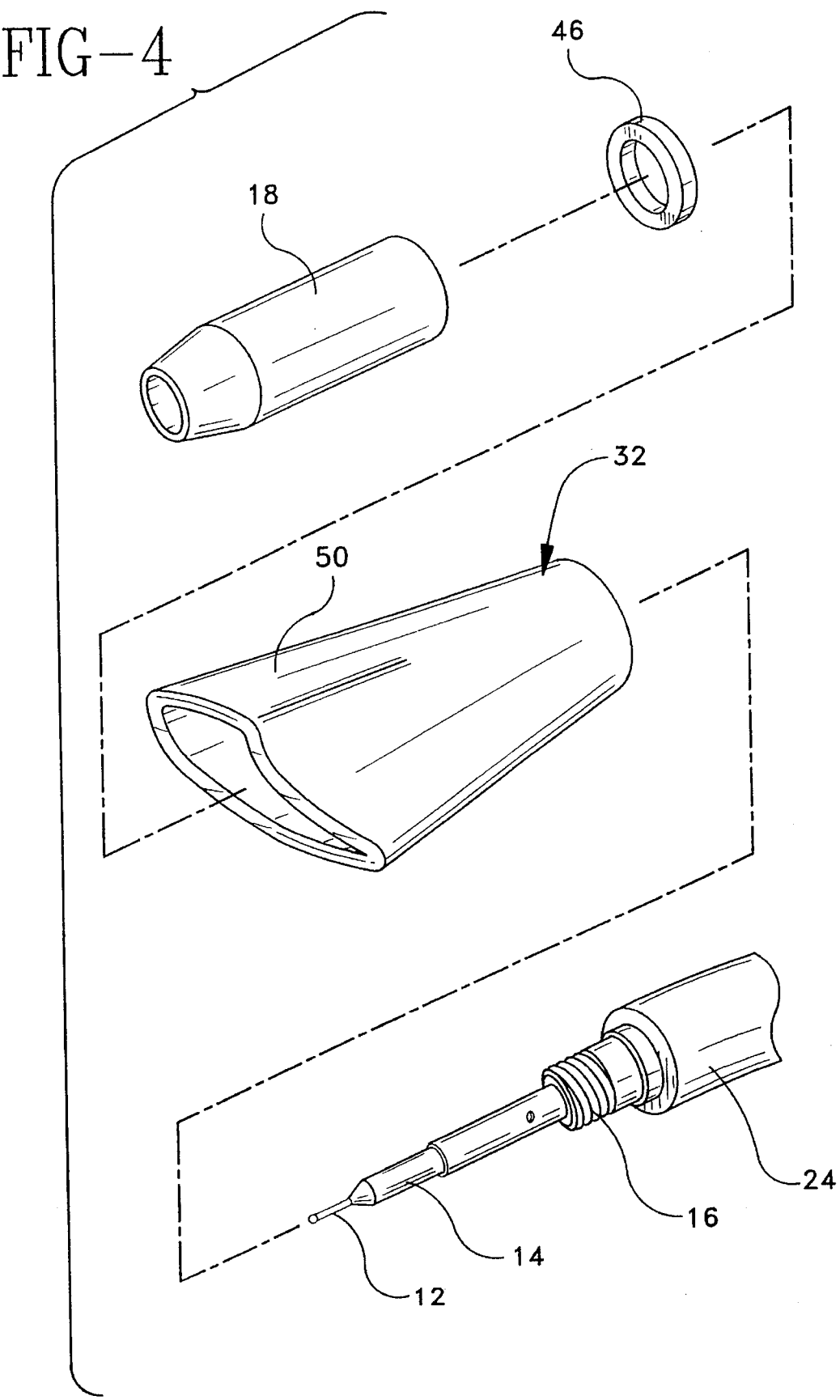
FIG. 4 is an exploded, perspective view thereof.
Figure 5:
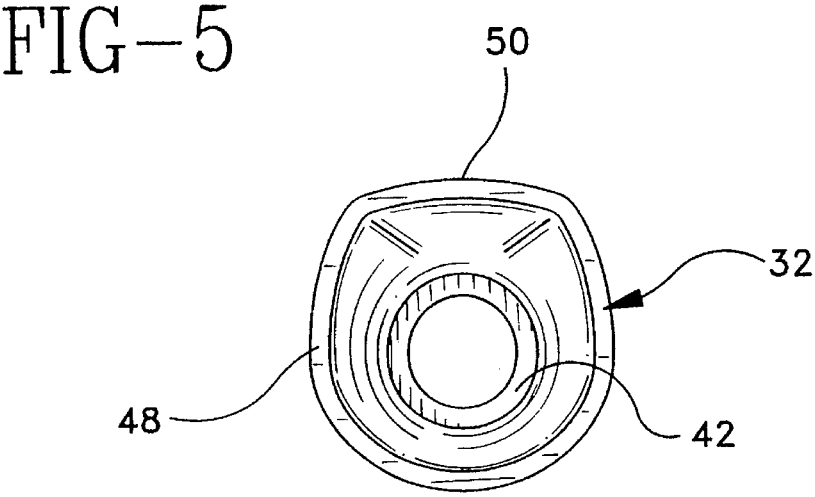
FIG. 5 is an end view of a shield according to the invention.

Arc welding is characterized by the generation of arc plasma 29 between the electrode and the metal workpiece 30, as shown in FIG. 3. A consumable electrode, such as a mig wire, is melted continuously by the arc.

The light generated by the arc plasma is intense, and precautions must be taken by the operator to protect the eyes and skin. A shield 32 is accordingly provided for this purpose. The shield shown in FIGS. 1–5 includes a generally conical, tubular body 34 having a first end 36, a second end 38, and a passage 40 for extending between the first and second ends. An end wall 42 extends substantially perpendicularly from or near the first end of the shield. The end wall includes a central opening 44 capable of receiving the guide tip 14. In the embodiment of the invention shown in FIG. 2, the end wall 42 abuts against the ends of the nozzle 18 and insulated tube 24, respectively. In the event the opening 44 is larger in diameter than the nozzle, a shim 46 may be provided between the end of the nozzle and the end wall 42, as shown in FIG. 4. The opening in the shim is smaller in diameter than the opening in the end wall, and smaller than the outside diameter of the nozzle with which it is used. The shim allows the shield 32 to be employed with mig welders which are not standard in size.

While the shield may be made from metal, glass or other light-shielding material, it is preferably made from a translucent material when intended for use with an operator-controlled apparatus. This allows the operator to safely view the arc plasma through the shield without damaging the eyes or skin. In the preferred embodiment of the invention shown in FIGS. 1–5, the entire shield is made from a heat-resistant, plastic material such as polycarbonate. The correct degree of translucency can be obtained by mixing a transparent polycarbonate with a dark color polycarbonate (e.g. dark green). The preferred translucency should be approximately the same as that found in the Code #10 translucent shields of helmets used by welders. Light generated by the arc plasma is substantially, but not entirely, prevented from being transmitted through the shield. This allows the operator to observe the workpiece and arc plasma without endangering himself or others. The translucency of the material per se depends upon the wall thickness of the shield. A wall thickness of about one eighth of an inch has been found to provide satisfactory durability and heat resistance. The polycarbonate is also blended to prevent the transmission of ultraviolet light.

The shield 32 shown in FIGS. 1–5 is designed for flexibility of use, safety, and to allow the operator to accurately view the arc plasma and workpiece. Flexibility is enhanced through the use of the rocker formed in the oblique end face 48 of the second end 38 of the shield body. Welding can accordingly be achieved from a number of different angles while substantially covering the arc plasma.

Safety is provided as the shield at all times protects against welding flash. The shield is employed such that the substantially flat wall 50 near the second end of the shield body is facing outwardly. A shield designed for a standard mig welding apparatus extends, for example, about seven eighths of an inch beyond the tip of the gas nozzle 18 on the substantially flat side of the shield. The opposite side of the shield terminates about one half inch short of the nozzle tip. While the exact dimensions are not believed to be critical, the shield must be shaped such that light generated by the arc plasma cannot be viewed directly by the operator of the welding apparatus.

Accuracy is enhanced by virtue of using the shield 32 as opposed to a shielded helmet or hand-held shield. The operator is able to view the workpiece at all times, even prior to commencing the process of welding. While he cannot see through the shield in the absence of the arc plasma, he can accurately position the electrode with respect to the workpiece. If a helmet is instead employed, the operator must insure that he holds the welding apparatus steady between the time he flips down his shield and actuates the apparatus. This drawback is eliminated through the use of the shield 32 described herein. Accuracy is further enhanced through the provision of the substantially flat wall 50. Such a wall reduces the distortion which would otherwise occur if the wall were curved.

Figure 6:
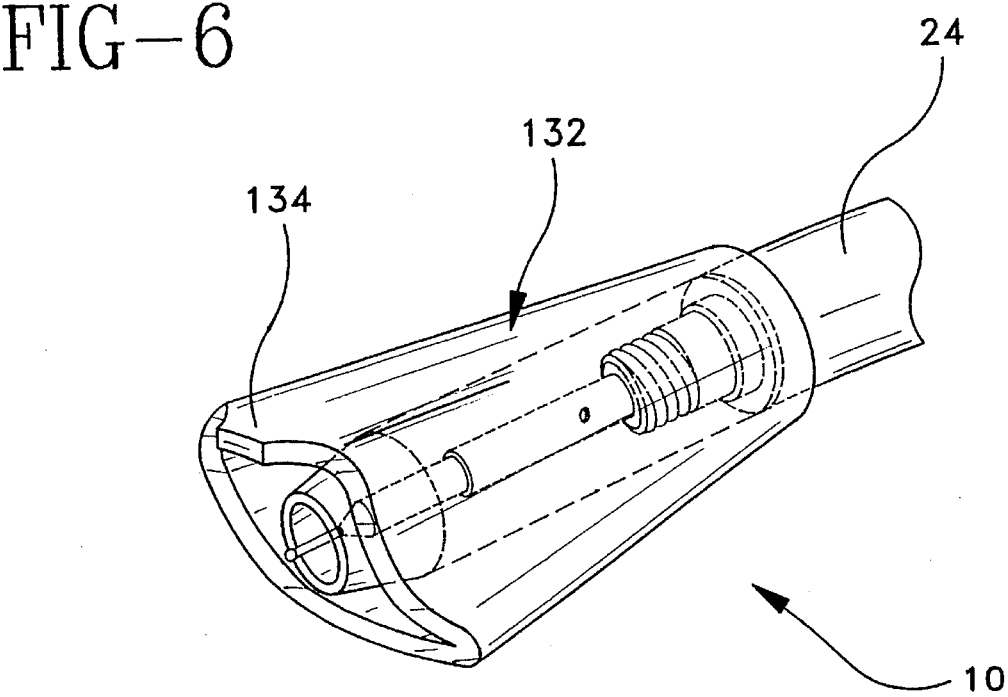
FIG. 6 is a top perspective view similar to FIG. 1 showing an alternative embodiment of a shield according to the invention.

Referring now to FIG. 6, the mig welding apparatus 10 is provided with a shield 132 in which the second end includes a pointed portion 134. The pointed portion may include a blunt tip, as shown, or terminate in a relatively sharp edge. In either event, the shield 132 is particularly advantageous for welding in corners. The shield is otherwise constructed in substantially the same manner as the shield 32 shown in FIGS. 1–5.

A third embodiment of the invention is shown in FIG. 7. The shield 232 includes an obliquely oriented end face 234 which is substantially flat in large part. The entirety of the end face 234 may be flat if desired. Such a construction allows a greater portion of the arc plasma to be closed off. It also allows the operator to hold the apparatus at the same welding angle. The end face, whether flat or including a rocker, preferably extends at an angle of between about 45°–65° with respect to the longitudinal axis of the shield. Industrial requirements or personal preferences may require an angle outside of this range.

FIG. 8 shows a fourth embodiment of the invention wherein the shield 332 includes a partially concave end face 334. The top portion of the end face, which adjoins the flat surface 338 of the otherwise generally conical shield body, protrudes forwardly, while the end face portion adjoining this top portion is slightly concave. Such an arrangement can be advantageous for closing off the arc plasma when welding curved surfaces.

Figure 9:
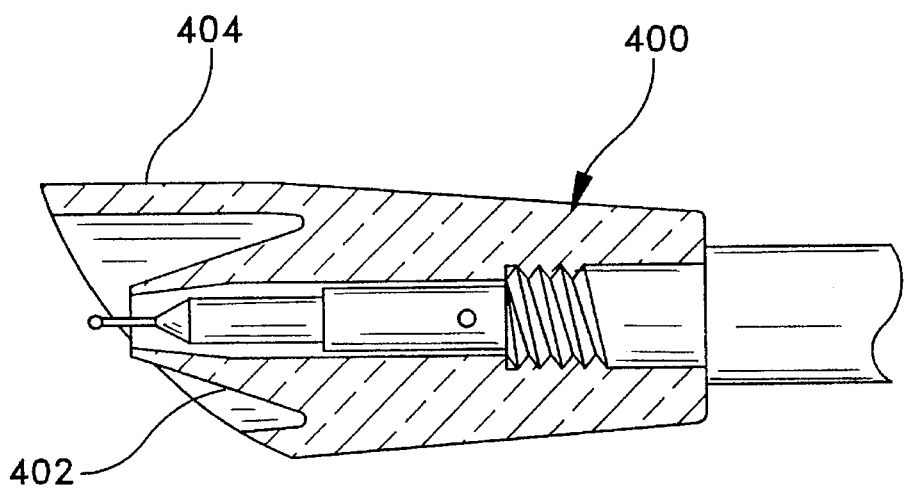
FIG. 9 is a sectional view of a fourth alternative embodiment of the invention.

FIG. 9 shows a fifth embodiment of the invention wherein the shield and gas nozzle are of integral construction. Such a shield/nozzle assembly 400 can be made from a metal or from a plastic which provides very high heat resistance, such as ULTEM, a polyether imide available from General Electric Corporation. Alternatively, the nozzle portion 402 can be made from a first material which can tolerate the heat of the arc plasma, while the shield portion 404 is made from a different material, such as polycarbonate, which provides satisfactory heat resistance in the shield area.

Figure 2:
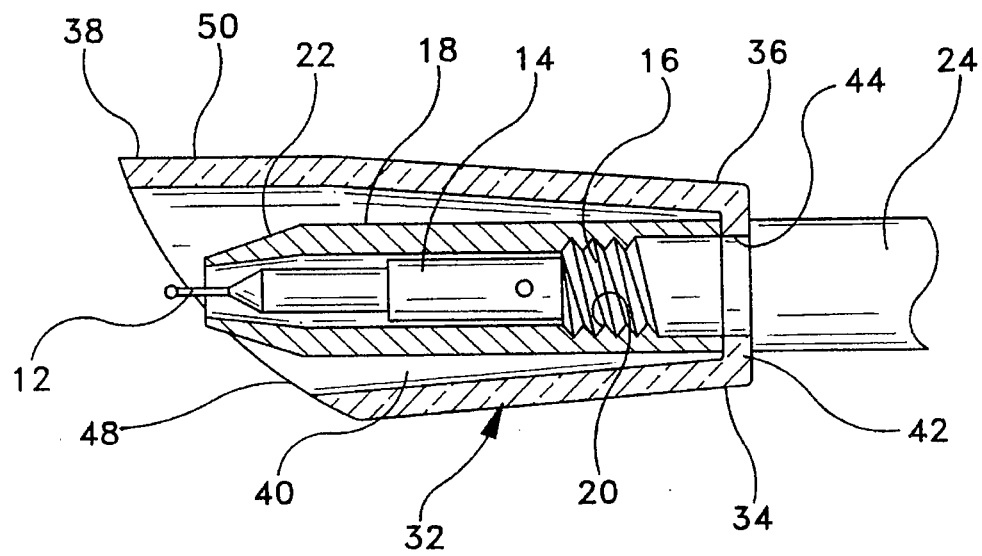
FIG. 2 is a sectional view thereof.

While the shields and shield nozzle assembly shown in FIGS. 1–9 are all integrally manufactured from one material, be it polycarbonate, metal or other material, it is well within the scope of the invention to make selected portions of the shield from one material and other portions from a second material. One may, for example, make all but the flat upper surface of the shield from metal or other opaque material, while the flat upper surface is made from translucent polycarbonate. The translucent portion can be a replaceable item, allowing the operator to replace it if it becomes too difficult to see through it following extended use. It can be pivotably attached to allow an unobstructed view of the weld site. The outer end of the replaceable translucent portion could also be shaped as shown in FIGS. 1 or 6 to allow the operator to customize the shield for a particular use.

Figure 10:
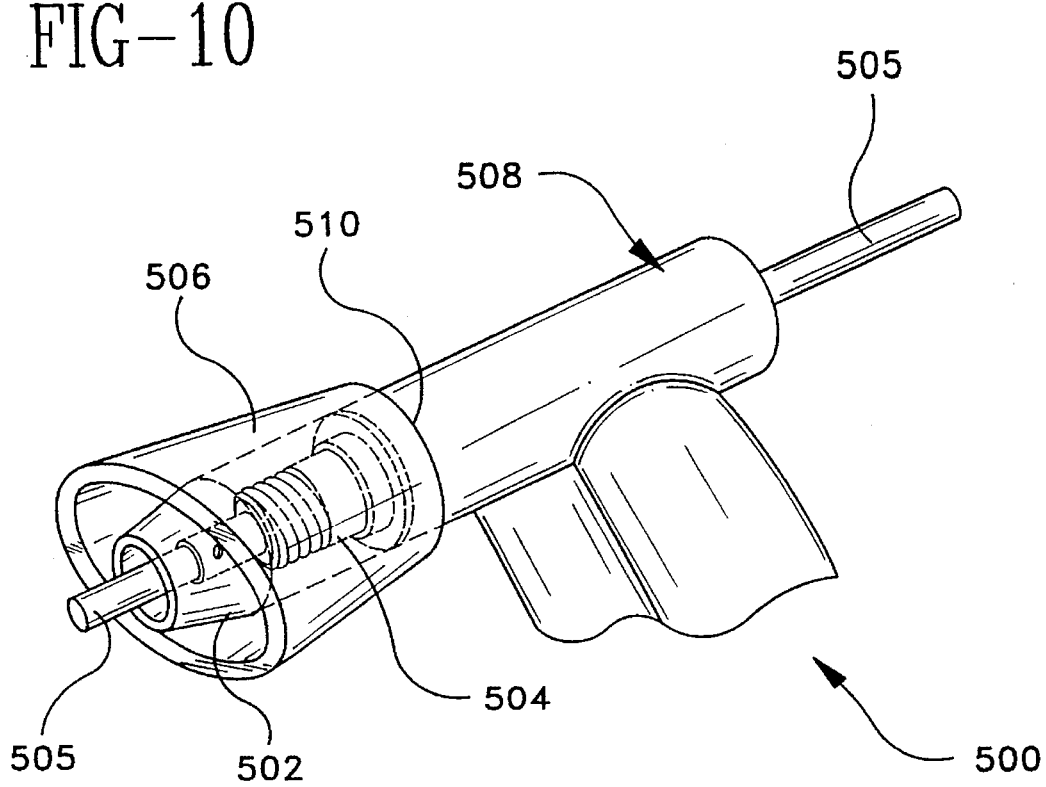
FIG. 10 is a perspective view of a tig welding apparatus according to the invention.

FIG. 10 provides a schematical illustration of a different type of arc welding apparatus 500, often referred to as a rig welder. Like the mig welder, the tig welder includes a gas nozzle 502 threadably secured to a guide tip 504. Instead of a wire electrode, a rigid rod 505 is employed. While the rod is not intended to be a consumable item, it does erode through extended use. It accordingly can be advanced through the guide tip as required.

The shield 506 employed with this apparatus 500 is similar in construction to that shown in FIGS. 1–5, though considerably shorter as the nozzle 502 is shorter than that found in standard mig welders. The shield body is at least partially translucent to allow the operator to safely view the arc plasma, and includes a relatively flat wall to reduce distortion.

In order to secure the shield 506, the nozzle 502 is first removed from the guide tip. The shield is slipped over the guide tip until it abuts an insulated portion of the handle assembly 508. The nozzle is then inserted through the shield and over the guide tip, and rotated until it is securely coupled thereto. The shield has an end wall 510 which is held in position between the nozzle and handle assembly, similar to the arrangement shown in FIG. 2. It will be noted that the handle assembly 508 does not include a trigger. This is due to the fact that tig welders are ordinarily actuated through the use of foot pedals (not shown).

While the different types of welders disclosed herein effect the fusion of two workpieces in different ways, the methods employed by the operator in employing the shielded assemblies is similar. The operator first removes the nozzle from the guide tip, slides the shield over the guide tip, and reattaches the nozzle, thereby holding the shield in place. The shield is rotatable about its longitudinal axis even after the nozzle is reapplied. It may accordingly be rotated to a position where the flat wall thereof is directly in the operator's line of vision when the electrode is positioned to begin the welding process. The welding apparatus is positioned such that the end surface of the shield is substantially parallel to the workpiece, as well as in adjoining relation thereto. Engagement of the shield and workpiece is possible, though not necessarily required. When the arc plasma is generated, the shield accordingly substantially prevents any light from emerging. The only light visible to the operator is the light seen through the shield, which is of such reduced intensity as to be harmless. By substantially covering the arc plasma with the shield, even bystanders are protected from most, if not all, damaging rays. The operator continues to maintain the substantially parallel relation of the shield end surface and workpiece until the welding operation has been completed.

As the polycarbonate shield does not tend to become extremely hot, it does not pose a danger to those who might inadvertently touch it following its use. To remove the shield and nozzle, rotation of the shield causes rotation of the nozzle, thereby allowing both to be removed at the same time.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A shield designed for attachment to a welding apparatus, comprising:

a tubular body having first and second ends and a passage connecting said ends, said second end defining an opening communicating with said passage;

an end wall extending substantially perpendicularly from said first end of said tubular body and adapted to bear against a nozzle of a welding apparatus, said end wall including an opening communicating with said passage;

said tubular body being of integral construction and made from a material which is translucent, said translucent material being capable of substantially, but not entirely, preventing the passage of visibly light generated by arc plasma.

2. A shield as described in claim 1, wherein said tubular body is made from a material of materials which substantially prevent the passage of ultraviolet light.

3. A shield as described in claim 1, wherein said tubular body is generally conical, said first end being smaller in diameter than said second end.

4. A shield as described in claim 3, wherein said tubular body includes a substantially planar, translucent portion adjacent said second end.

5. A shield as described in claim 3, wherein said tubular body includes an end surface at said second end extending obliquely with respect to said end wall.

6. A shield as described in claim 5, wherein said end surface defines a rocker at said second end of said tubular body.

7. A shield as described in claim 5, wherein said end surface defines a substantially pointed portion.

8. A shield as described in claim 1, including a nozzle positioned within said tubular body and adjoining said end wall.

9. A shield as described in claim 8, including a shim removably positioned within said tubular body and adjoining said end wall, said shim including an opening smaller in diameter than said opening through said end wall.

10. A shield as described in claim 8, wherein said nozzle is integral with said end wall.

11. A shield as described in claim 1, wherein said tubular body is made from a material which provides substantial heat resistance.

12. A welding apparatus as described in claim 1 wherein said tubular body and said end wall are comprised of a heat resistance, polymeric material, and are integrally formed.

13. A welding apparatus comprising:

a tip assembly including a gas nozzle and an electrode extending through said gas nozzle, and a substantially opaque shield mounted to said tip assembly, said shield including a tubular body of a translucent material capable of substatially, but not entirely, preventing the passage of visible light generated by arc plasma, said tubular body being of integral construction having first and second ends, said second end including an oblique end surface defining an opening, said gas nozzle and said electrode being at least partially enclosed by said tubular body, said gas nozzle including an end adjoining said opening.

14. A welding apparatus as described in claim 13, wherein said oblique end surface extends in first part beyond said end of said gas nozzle, said end of said gas nozzle extending beyond a second part of said oblique end surface.

15. A welding apparatus as described in claim 14, wherein said tubular body is generally conical, and includes a flat wall portion adjacent to said first part of said oblique end surface.

16. A welding apparatus as described in claim 14, wherein said first part of said end surface has a pointed portion.

17. A welding apparatus as described in claim 13, wherein said tubular body is made from a material providing high heat resistance.

18. A welding apparatus as described in claim 13, wherein said electrode is a wire.

19. A welding apparatus as described in claim 13, wherein said end surface of said tubular body includes a rocker.

20. A welding apparatus as described in claim 13 wherein said shield is comprised of a heat resistant, polymeric material.

21. A welding apparatus comprising:

a tip assembly including a gas nozzle and an electrode extending through said gas nozzle, and a shield mounted to said tip assembly, said shield including a tubular body comprised of a translucent material capable of substantially, but not entirly, preventing the passage of visible light generated by arc plasma and having first and second ends and an end wall, said second end including an opening, said gas nozzle and said electrode being at least partially enclosed by said tubular body, said gas nozzle including an end adjoining said opening, said tip assembly including an external thread, said gas nozzle including an internal thread coupled to said external thread of said tip assembly, said gas nozzle including a rear surface bearing against said end wall of said shield, thereby maintaining said shield in position.

22. A welding apparatus as described in claim 21, including a handle, a tube extending from said handle, said end wall of said shield being rotatably maintained between an end of said tube and said rear surface of said gas nozzle.

23. A welding apparatus as described in claim 21 wherein said shield is comprised of a heat resistant, polymeric material.

* * * * *